(12) United States Patent
Xiao et al.

(10) Patent No.: US 10,849,149 B2
(45) Date of Patent: Nov. 24, 2020

(54) SCHEDULING REQUEST TRIGGERING METHOD, APPARATUS, AND SYSTEM

(71) Applicant: Huawei Technologies Co., Ltd., Shenzhen, Guangdong (CN)

(72) Inventors: Xiao Xiao, Beijing (CN); Zhenzhen Cao, Beijing (CN); Yao Hua, Shenzhen (CN); Guanglin Han, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/195,335

(22) Filed: Nov. 19, 2018

(65) Prior Publication Data

US 2019/0090264 A1 Mar. 21, 2019

Related U.S. Application Data

(63) Continuation of application No. PCT/CN2016/082849, filed on May 20, 2016.

(51) Int. Cl.
*H04W 72/12* (2009.01)
*H04W 4/46* (2018.01)
(Continued)

(52) U.S. Cl.
CPC ......... *H04W 72/1284* (2013.01); *H04W 4/46* (2018.02); *H04W 28/0278* (2013.01); *H04W 72/042* (2013.01)

(58) Field of Classification Search
CPC . H04W 72/1284; H04W 72/042; H04W 4/46; H04W 72/1278; H04W 28/0278; H04W 28/0252; H04W 28/0257
See application file for complete search history.

(56) References Cited

U.S. PATENT DOCUMENTS

2011/0143801 A1\* 6/2011 Bucknell ................. H04L 1/188
455/514
2011/0199991 A1\* 8/2011 Harris ............... H04W 72/1263
370/329
(Continued)

FOREIGN PATENT DOCUMENTS

WO 2015142082 A1 9/2015

OTHER PUBLICATIONS

3GPP TS 36.321 V13.1.0 (Mar. 2016), Technical Specification, 3rd Generation Partnership Project, Technical Specification Group Radio Access Network, Evolved Universal Terrestrial Radio Access (E-UTRA), Medium Access Control (MAC) protocol specification(Release 13), Mar. 2016, 85 pages.

*Primary Examiner* — Hoang-Chuong Q Vu
(74) *Attorney, Agent, or Firm* — Fish & Richardson P.C.

(57) ABSTRACT

A scheduling request triggering method, apparatus, and system are disclosed. The method includes: obtaining, by a terminal device, an uplink semi-persistent scheduling resource allocated by a base station, where the uplink semi-persistent scheduling resource is used to transmit to-be-transmitted data on a logical channel of the terminal device; receiving, by the terminal device, scheduling request masking set by the base station for a first logical channel; and after determining that a triggering condition is satisfied, triggering, by the terminal device, a scheduling request via the first logical channel. In this way, when a status of data of the terminal device changes, an appropriate scheduling resource can be obtained, so as to ensure timely data transmission.

14 Claims, 9 Drawing Sheets

(51) Int. Cl.
*H04W 72/04* (2009.01)
*H04W 28/02* (2009.01)

(56) References Cited

U.S. PATENT DOCUMENTS

| | | | | |
|---|---|---|---|---|
| 2011/0300858 A1* | 12/2011 | Lee | ......................... | H04W 8/24 |
| | | | | 455/425 |
| 2013/0028223 A1* | 1/2013 | Kim | ...................... | H04L 5/0053 |
| | | | | 370/329 |
| 2014/0135027 A1* | 5/2014 | Kodali | .............. | H04W 72/1278 |
| | | | | 455/452.1 |
| 2014/0293930 A1* | 10/2014 | Rosa | ................. | H04W 72/1221 |
| | | | | 370/329 |
| 2015/0358998 A1* | 12/2015 | Golitschek Edler Von | | |
| | | Elbwart | ................ | H04W 48/16 |
| | | | | 370/280 |
| 2015/0382372 A1* | 12/2015 | Vajapeyam | ........... | H04W 24/10 |
| | | | | 370/329 |
| 2016/0157256 A1* | 6/2016 | Tseng | ................ | H04W 72/1284 |
| | | | | 370/329 |
| 2017/0280486 A1* | 9/2017 | Lee | ......................... | H04W 76/40 |
| 2017/0310433 A1* | 10/2017 | Dinan | ................... | H04L 5/0046 |
| 2017/0318606 A1* | 11/2017 | Lee | ......................... | H04L 67/12 |
| 2018/0270722 A1* | 9/2018 | Kim | .................. | H04W 36/0072 |
| 2019/0335356 A1* | 10/2019 | Lee | .................. | H04W 72/1284 |

* cited by examiner

SCHEDULING REQUEST TRIGGERING METHOD, APPARATUS, AND SYSTEM

CROSS-REFERENCE TO RELATED APPLICATIONS

This application is a continuation of International Application No. PCT/CN2016/082849, filed on May 20, 2016, the disclosure of which is hereby incorporated by reference in its entirety.

TECHNICAL FIELD

The present disclosure relates to wireless communications technologies, and in particular, to a scheduling request triggering method, an apparatus, and a system.

BACKGROUND

"Vehicle to vehicle" (V2V) communications is a wireless communications technology for performing data transmission and information exchange between vehicles. A service carried by the V2V communications is referred to as a "V2V message". A vehicle may exchange a V2V message with another surrounding vehicle through the V2V communications, to obtain road condition information or receive a vehicle driving safety related information service in a timely manner, and assist a vehicle driver in performing danger predetermining and a corresponding operation, so as to avoid an accident to a great extent.

The existing LTE system supports allocating, to an in-vehicle terminal device in a semi-persistent scheduling (SPS) manner based on an arrival period of a data packet including a V2V message, an SPS resource matching a period of the V2V message. In the prior art, a base station usually also configures scheduling request masking (SR masking) for a logical channel that transmits the V2V message, to prevent the logical channel from triggering and reporting an unnecessary scheduling request (SR).

However, as a vehicle driving status changes, a status of the V2V message also changes. For example, an period for arriving at the logical channel changes, and consequently the V2V message cannot match the previously configured SPS resource. In addition, due to the existence of the SR masking, the in-vehicle terminal device cannot obtain, in a timely manner by reporting a scheduling request, a resource scheduled by the base station. As a result, a waiting time of the data packet is expired, causing a packet loss.

SUMMARY

Embodiments of the present disclosure provide a scheduling request triggering method, an apparatus, and a system, so as to trigger a scheduling request flexibly, obtain, in a timely manner, a resource scheduled by a base station, and send data of a terminal device.

According to one aspect, an embodiment of the present disclosure provides a scheduling request triggering method. The method includes obtaining, by a terminal device, an uplink semi-persistent scheduling resource allocated by a base station, where the uplink semi-persistent scheduling resource is used to transmit to-be-transmitted data on a logical channel of the terminal device; receiving, by the terminal device, scheduling request masking set by the base station for a first logical channel; and after determining that a predefined triggering condition is satisfied, triggering, by the terminal device, a scheduling request via the first logical channel. According to the solution provided in this embodiment, the terminal device can still trigger and report the SR when using the SPS resource and being limited by the SR masking, ensuring timely data transmission.

In a possible design, before the triggering a scheduling request via the first logical channel, the method further includes: triggering, by the terminal device, a regular buffer status report via the first logical channel, where the regular buffer status report is triggered when the data arrives at the first logical channel. The regular buffer status report includes volume information of the data buffered on the first logical channel.

In a possible design, the predefined triggering condition includes at least one of the following conditions:

a. from a time when the regular buffer status report is triggered, in subsequent K transmission time intervals, there is no uplink resource allocated by the base station to the terminal device, where K is an integer greater than 0;

b. a volume of the to-be-transmitted data buffered on the first logical channel is greater than a specified threshold;

c. an upper layer protocol stack of the terminal device instructs to discard a part of the to-be-transmitted data on the first logical channel;

d. a volume of the data buffered on the first logical channel is reduced, and the terminal device has no to-be-transmitted MAC PDU in a current transmission time interval; and e. an arrival period of a data packet on the first logical channel changes.

In a possible design, the method further includes: sending, by the terminal device, the scheduling request to the base station.

In a possible design, after the determining, by the terminal device, that a predefined triggering condition is satisfied, the method further includes: canceling, by the terminal device, autonomously a limitation of the scheduling request masking on the first logical channel. In this way, it is ensured that when transmitting data whose status changes, the terminal device can obtain, in a timely manner, a resource scheduled by the base station, thereby avoiding a data loss.

In a possible design, the method further includes sending, by the terminal device, the regular buffer status report to the base station by using the uplink resource allocated by the base station.

According to another aspect, an embodiment of the present disclosure provides a scheduling request triggering method. The method includes allocating, by a base station, an uplink semi-persistent scheduling resource to a terminal device, where the uplink semi-persistent scheduling resource is used to transmit to-be-transmitted data on a logical channel of the terminal device; setting, by the base station, scheduling request masking for a first logical channel; and receiving, by the base station, a scheduling request sent by the terminal device, where the scheduling request is triggered by the terminal device via the first logical channel after the terminal device determines that a predefined triggering condition is satisfied. According to the solution provided in this embodiment, the terminal device can still trigger and report the SR when using the SPS resource and being limited by the SR masking, ensuring timely data transmission.

In a possible design, the allocating, by a base station, an uplink semi-persistent scheduling resource to a terminal device includes: configuring and activating, by the base station, the semi-persistent scheduling resource. The base station configures the uplink semi-persistent scheduling resource for the terminal device by using an RRC dedicated message.

In a possible design, the base station configures the first logical channel by using an RRC dedicated message, and set the scheduling request masking for the first logical channel.

In a possible design, the base station receives the scheduling request and a regular buffer status report sent by the terminal device. The base station allocates a new uplink resource to the terminal device based on the regular buffer status report, where the new uplink resource is used to transmit data of the terminal device. The base station may allocate the uplink resource to the terminal device through dynamic scheduling. The base station may alternatively reallocate an uplink semi-persistent scheduling resource to the terminal device. For example, the base station may reallocate the uplink semi-persistent scheduling resource to the terminal device based on a new arrival period of the data.

In a possible design, the method further includes sending, by the base station, reconfiguration information of the first logical channel to the terminal device based on a preset condition. The preset condition is that a quantity of times of receiving the regular buffer status report of the first logical channel by the base station is greater than n, where n is an integer that is greater than 0 and that is determined based on a data transmission requirement. The base station may reconfigure the first logical channel by using an RRC dedicated message, and cancel the scheduling request masking for the first logical channel. In this way, in a subsequent transmission process of the terminal device, for data whose status changes, the terminal device may obtain, in a timely manner, a resource scheduled by the base station, to ensure timely data transmission.

According to still another aspect, an embodiment of the present disclosure provides a terminal device, where the terminal device has functions of implementing behavior of the terminal device in the foregoing method. The terminal device may be a terminal device supporting V2V message transmission. The functions may be implemented by hardware, and a structure of the terminal device includes a transceiver and a processor. The functions may alternatively be implemented by executing corresponding software by hardware. The hardware or software includes one or more modules corresponding to the foregoing functions. The module may be software and/or hardware.

According to still another aspect, an embodiment of the present disclosure provides a base station, where the base station has functions of implementing behavior of the base station in the foregoing method. The functions may be implemented by hardware, or may be implemented by hardware executing corresponding software. The hardware or software includes one or more modules corresponding to the foregoing functions.

In a possible design, a structure of the base station includes a processor and a transceiver, where the processor is configured to support the base station in performing corresponding functions in the foregoing method. The transceiver is configured to support communication between the base station and a terminal device, send information or an instruction in the foregoing method to the terminal device, and receive information or an instruction sent by the base station. The base station may further include a memory, where the memory is configured to couple to the processor and store a program instruction and data that are necessary for the base station.

According to still another aspect, an embodiment of the present disclosure provides a communications system, and the system includes the base station and the terminal device that are described in the foregoing aspects.

According to still another aspect, an embodiment of the present disclosure provides a computer storage medium, configured to store a computer software instruction used by the foregoing terminal device, and the computer software instruction includes a program designed for performing the foregoing aspects.

According to still another aspect, an embodiment of the present disclosure provides a computer storage medium, configured to store a computer software instruction used by the foregoing base station, and the computer storage medium includes a program designed for executing the foregoing aspects.

According to the technical solutions provided by the embodiments of the present disclosure, when the base station allocates the uplink SPS resource to the terminal device and configures the SR masking for the logical channel for transmitting data of the terminal device, a scheduling request can still be triggered and reported when the predefined triggering condition is satisfied for the logical channel. This not only reduces scheduling overheads, but also ensures that the terminal device can still flexibly trigger a scheduling request when a status of the data of the terminal device changes, so as to obtain, in a timely manner, a resource scheduled by the base station, thereby avoiding a data packet loss.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
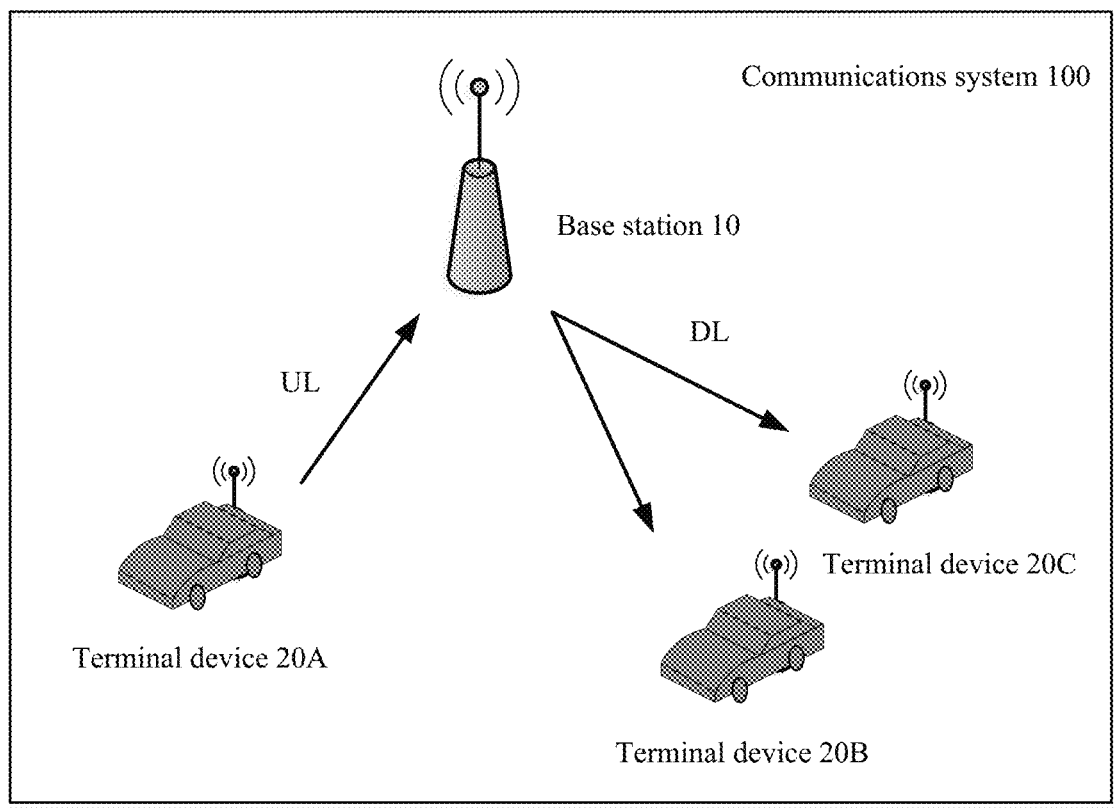
FIG. 1 is a schematic diagram of a communications system according to an embodiment of the present disclosure.

The solutions provided by the embodiments of the present disclosure are based on a communications system 100 shown in FIG. 1, where the communications system 100 supports V2V communications. The communications system 100 includes at least one base station 10 (BS) and a plurality of terminal devices, for example, an in-vehicle terminal device. The plurality of terminal devices may be identified as terminal devices 20A to 20C, respectively. The plurality of terminal devices 20A to 20C may perform V2V message transmission with each other via the base station 10. A V2V message transmitted by the terminal device mainly includes information related to a vehicle driving status, for example, a speed of a vehicle, a driving direction, a longitude/latitude (a location), an acceleration (acceleration and deceleration), whether to brake, and whether to change lanes; and information related to a surrounding road environment such as an accident, road construction, and a fault of traffic facilities. An air interface for performing uplink/downlink transmission between the terminal device and the base station is referred to as a "Uu interface".

The terminal device sends the V2V message to the base station in an uplink (UL) unicast mode, and the base station sends the V2V message to another terminal device in a downlink (DL) broadcast mode. For example, when the terminal device 20A needs to communicate with the other terminal devices 20B and 20C, the terminal device 20A first sends the foregoing V2V message to the base station 10, the base station 10 then sends the V2V message to the terminal devices 20B and 20C in a broadcast mode, and then the terminal devices 20B and 20C receive the broadcast message sent by the base station 10. In this way, transmission of the V2V message between the terminal device 20A and the terminal devices 20B and 20C is implemented. The terminal devices 20B and 20C each may perform interactive communication with the other terminal devices in the foregoing manner, and details are not repeated herein.

In the embodiments of the present disclosure, the communications system 100 may be one of various radio access technology (RAT) systems, such as a Code Division Multiple Access (CDMA) system, a Time Division Multiple Access (TDMA) system, a Frequency Division Multiple Access (FDMA) system, an Orthogonal Frequency-Division Multiple Access (OFDMA) system, and a Single Carrier Frequency Division Multiple Access (SC-FDMA) system. A term "system" and a term "network" can be replaced with each other. The CDMA system can implement a wireless technology such as Universal Terrestrial Radio Access (UTRA) and CDMA 2000. The UTRA may include a wideband CDMA (WCDMA) technology and another CDMA variant technology. The CDMA 2000 may cover the interim standard (IS) 2000 (IS-2000) standard, the IS-95 standard, and the IS-856 standard. The TDMA system can implement a wireless technology such as the Global System for Mobile communications (GSM). The OFDMA system can implement a wireless technology such as evolved Universal Terrestrial Radio Access (E-UTRA), Ultra Mobile Broadband (UMB), IEEE 802.11 (Wi-Fi), IEEE 802.16 (WiMAX), IEEE 802.20, and Flash OFDMA. The UTRA and the E-UTRA belong to UMTS and an evolved version of the UMTS, respectively. Versions of 3GPP Long Term Evolution (LTE) and 3GPP LTE-advanced are new versions of the UMTS using the E-UTRA. In addition, the communications system 100 may be further applicable to a future-oriented communications technology, and any communications system can be applicable to the technical solutions provided by the embodiments of the present disclosure, provided that the communications system using a new communications technology can implement V2V communications. A system architecture and a service scenario that are described in the embodiments of the present disclosure are intended to more clearly describe the technical solutions in the embodiments of the present disclosure, and constitute no limitation on the technical solutions provided in the embodiments of the present disclosure. A person of ordinary skill in the art may learn that as the network architecture evolves and a new service scenario emerges, the technical solutions provided in the embodiments of the present disclosure are also applicable to a similar technical problem.

The terminal device in the embodiments of the present disclosure may also be referred to as user equipment (UE), a mobile station (MS), a mobile terminal, and the like, and the terminal device may communicate with one or more core networks through a radio access network (RAN). For example, the terminal device may be a mobile phone (also referred to as a "cellular" phone), a computer with a mobile terminal, and the like. For example, may alternatively be a portable, pocket-sized, handheld, computer built-in, or in-vehicle mobile apparatus, which exchanges voice and/or data with the radio access network. Each terminal device in the embodiments of the present disclosure is a terminal device supporting a V2V function.

In the embodiments of the present disclosure, the base station (for example, the base station 10) may include macro base stations, micro base stations (also referred to as small cells), relay nodes, access points, and the like in various forms. In systems using different wireless access technologies, a device having a base station function may have different names. For example, the device is referred to as an evolved nodeB (eNB, or eNodeB) in an LTE system, and the device is referred to as a node B in a 3rd generation (3G) system. For convenient description, in all the embodiments of the present disclosure, the foregoing apparatus that provides a wireless communication function for the terminal device is collectively referred to as a base station.

It should be noted that, a quantity of terminal devices included in the communications system 100 shown in FIG. 1 is only an example, the embodiments of the present disclosure are not limited thereto. For example, more terminal devices that communicate with the base station may alternatively be included. For concise description, details are not shown in the accompanying drawings. In addition, in the communications system 100 shown in FIG. 1, although the base station 10 and the plurality of terminal devices 20a to 20c are shown, the communications system 100 may not be limited to including the base station and the plurality of terminal devices, for example, may further include a core network device, a device used to bear a virtualized network function, or the like. These are obvious for a person of ordinary skill in the art, and details are not described herein.

In the prior art, after an uplink SPS resource is allocated for data transmission of a terminal device, SR masking is further set for a logical channel used to transmit data. Therefore, when data of the terminal device does not match the allocated SPS resource any longer, under an action of the SR masking, the logical channel cannot trigger and report a scheduling request, and therefore a new uplink resource cannot be obtained. As a result, a waiting time of a part of data packets is expired, causing a packet loss.

In the solutions provided by the embodiments of the present disclosure, the base station allocates an uplink SPS resource to the terminal device, and sets SR masking for a logical channel used to send data of the terminal device. After the terminal device receives the foregoing configuration from the base station, in general, the logical channel is limited by the SR masking, so that a scheduling request cannot be triggered. However, the terminal device still cannot be limited by the SR masking under a predefined triggering condition, and can trigger and report the scheduling request to the base station, to request the base station to allocate a new uplink resource for data that is to be sent by the terminal device. Therefore, according to the method provided by the embodiments of the present disclosure, when the data to be sent by the terminal device does not match the SPS resource allocated by the base station, the scheduling request can still be sent, and an appropriate uplink resource can be obtained in a scheduling manner. In this case, a packet loss caused because a waiting time of data is expired is avoided.

In the embodiments of the present disclosure, after receiving the scheduling request reported by the terminal device, the base station may further send reconfiguration information of the logical channel to the terminal device, and the terminal device cancels a limitation of the SR masking on the logical channel based on the reconfiguration information. Alternatively, the terminal device autonomously cancels a limitation of the SR masking on the logical channel. In this way, for data whose status changes, in a subsequent transmission process, the terminal device requests resource allocation to the base station in a scheduling manner of the prior art, to ensure timely data transmission.

In the embodiments of the present disclosure, the resource may be a time-frequency resource.

Figure 2:
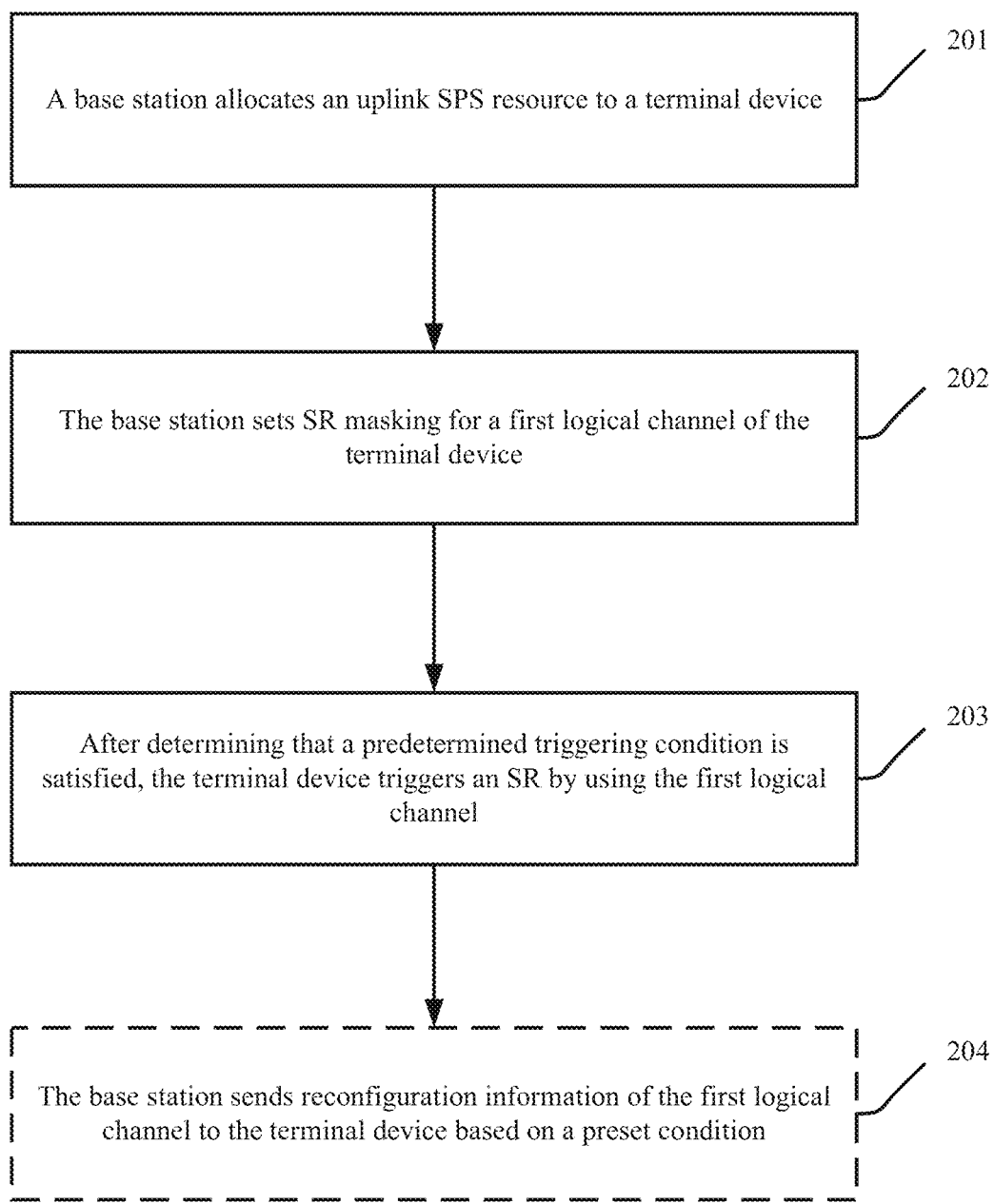
FIG. 2 is a flowchart of a scheduling request triggering method according to an embodiment of the present disclosure.
Figure 3:
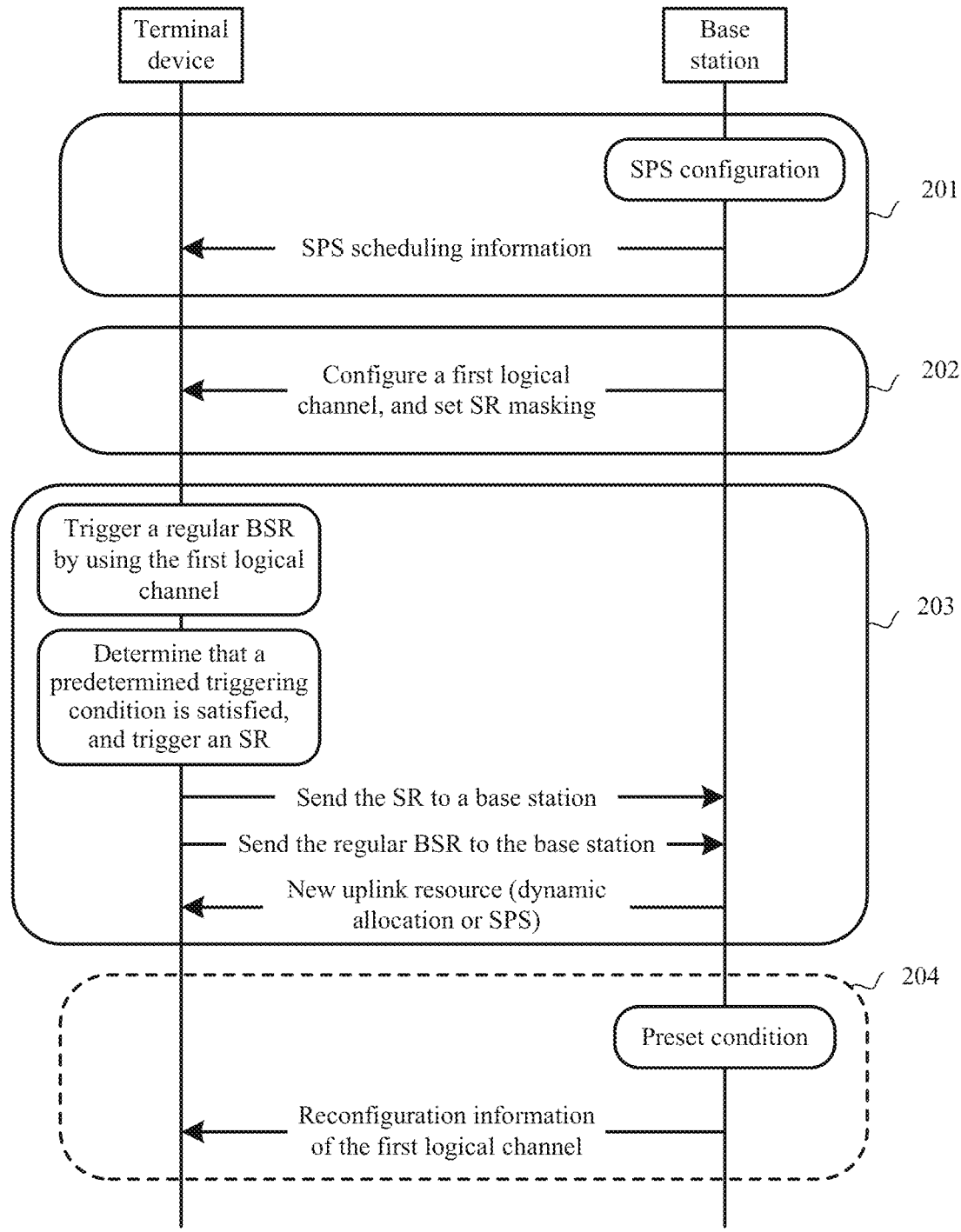
FIG. 3 is a schematic diagram of a scheduling request triggering method according to another embodiment of the present disclosure.

FIG. 2 and FIG. 3 are a flowchart and a schematic diagram of a scheduling request triggering method according to an embodiment of the present disclosure, respectively. With reference to FIG. 2 and FIG. 3, the following describes in detail the method provided in this embodiment.

In step 201, a base station allocates an uplink SPS resource to a terminal device.

As shown in FIG. 3, the base station allocates, by configuring and activating the uplink SPS resource, the uplink SPS resource to the terminal device for use.

A. Configuration of the Uplink SPS Resource:

In this embodiment, the base station may send configuration information of the uplink SPS resource to the terminal device by using a radio resource control (RRC) dedicated message RRCConnectionReconfiguration.

Optionally, the configuration information of the SPS resource includes parameters such as an SPS period, an SPS scheduling identifier (e.g. SPS Cell Radio Network Temporary Identifier, SPS C-RNTI), and an SPS release condition (e.g. Modulation and Coding Scheme, MCS).

B. Activation of the Uplink SPS Resource:

In this embodiment, the base station may scramble a physical downlink control channel (PDCCH) by using the SPS C-RNTI, and then send scheduling information of the uplink SPS resource to the terminal device by using the PDCCH.

Optionally, the scheduling information of the uplink SPS resource includes SPS verification information and SPS resource allocation information. The SPS resource allocation information is used to indicate a time-frequency location of the allocated uplink SPS resource.

Hereafter, the terminal device descrambles the PDCCH by using the SPS C-RNTI in the SPS configuration information sent by the base station, and receives information transmitted by using the PDCCH. The terminal device identifies, by using the foregoing SPS verification information, that the received information is the scheduling information of the uplink SPS resource, and obtains, by using the SPS resource allocation information in the scheduling information of the uplink SPS resource, the uplink SPS resource allocated by the base station. In this way, SPS activation is completed. After activation is completed, the uplink SPS resource configured by the base station for the terminal device takes effect, and the terminal device may begin to use the allocated uplink SPS resource periodically for data transmission.

It should be noted that, the uplink SPS resource is used to transmit to-be-transmitted data in a logical channel of the terminal device. The base station may configure one or more logical channels for the terminal device, and the following first logical channel is one of the one or more logical channels. The terminal device may use the uplink SPS resource to transmit data that is on any one or more logical channels of the terminal device.

In step 202, the base station sets SR masking for a first logical channel of the terminal device.

In this embodiment, the base station sends configuration information of the first logical channel to the terminal device by using an RRC dedicated message RRCConnectionReconfiguration, to configure the first logical channel. The base station may set the SR masking for the first logical channel by using a logicalChannelSR-Mask field in the configuration information of the first logical channel. In general, the first logical channel is limited by the SR masking, so that a scheduling request cannot be triggered.

It should be noted that, there is no necessary sequence between step 201 of allocating, by a base station, an uplink SPS resource to a terminal device and step 202 setting, by the base station, SR masking for a first logical channel of the terminal device.

In step 203, after determining that a predefined triggering condition is satisfied, the terminal device triggers an SR via the first logical channel.

In this embodiment, as shown in FIG. 3, when a new to-be-transmitted data packet arrives at the first logical channel, a regular buffer status report (Regular BSR) is triggered at a Medium Access Control (MAC) protocol layer. The regular BSR is used to report, to the base station, volume information of data currently buffered by the terminal device, where the regular BSR includes at least the volume information of the data buffered on the first logical channel. It can be understood that, the base station may allocate an appropriate uplink resource for the to-be-transmitted data of the terminal device based on the volume information of the data buffered on the first logical channel.

In this embodiment, the terminal device determines, at the MAC protocol layer after triggering the regular BSR on the first logical channel, whether the predefined triggering condition of the SR is satisfied for the first logical channel. If the predefined triggering condition is not satisfied, the terminal device does not trigger the SR via the first logical channel. If the predefined triggering condition is satisfied, when the SR masking is set for the first logical channel, the terminal device can still trigger the SR via the first logical channel and perform a subsequent operation.

In this embodiment, the predefined triggering condition of the SR is at least one of the following conditions:

a. From a time when the regular BSR is triggered, in subsequent K transmission time intervals (TTI), there is no uplink resource allocated by the base station to the terminal device, where K is an integer greater than 0.

As described in the foregoing, when a waiting time of the to-be-transmitted data exceeds a specific time, a data packet loss is caused. Therefore, the terminal device may set a value of K based on an actual transmission requirement. For example, K may be set to a maximum time interval for waiting under a premise that no data packet loss is caused.

b. A volume of the to-be-transmitted data buffered on the first logical channel is greater than a specified threshold.

The terminal device may determine the specified threshold based on an actual transmission requirement. For example, the specified threshold may be set based on a maximum volume of data that can be transmitted by using one SPS resource block. Therefore, when the volume of the to-be-transmitted data exceeds a maximum volume of data that can be transmitted at a time by using an SPS resource, the terminal device may request new-resource allocation.

c. An upper layer protocol stack of the terminal device instructs to discard a part of the to-be-transmitted data on the first logical channel.

When some data packets are lost, the upper layer protocol stack of the terminal device may instruct to discard the data packets.

Optionally, the upper layer protocol stack of the terminal device may be the Packet Data Convergence Protocol (PDCP).

d. A volume of the data buffered on the first logical channel is reduced, and the terminal device has no to-be-transmitted MAC PDU (PDU) in a current TTI.

e. An arrival period of a data packet on the first logical channel changes.

It can be understood that, the uplink SPS resource allocated by the base station for the terminal device matches the arrival period of the data. When the arrival period of the data changes, the changed arrival period of the data does not match a period of the allocated uplink SPS resource, and therefore the data cannot be sent in a timely manner.

In this embodiment, if the terminal device determines that the foregoing predefined triggering condition is satisfied, the terminal device is not limited by the set SR masking, and can still trigger the SR via the first logical channel and perform a subsequent operation; or if the terminal device determines that the foregoing predefined triggering condition is not satisfied, the terminal device cannot trigger the SR via the first logical channel and does not perform a subsequent operation.

After determining that the foregoing predefined triggering condition is not satisfied, as shown in FIG. 3, the terminal device triggers the SR via the first logical channel and sends the SR to the base station.

After receiving the SR sent by the terminal device, the base station allocates, to the terminal device, an uplink resource used for sending the regular BSR. The terminal device sends the regular BSR to the base station by using the uplink resource, where the regular BSR includes the volume information of the data buffered on the first logical channel. Then, the base station allocates a new uplink resource for the to-be-transmitted data of the terminal device based on the volume information, included in the regular BSR, of the data buffered on the first logical channel.

Optionally, the base station may allocate the new uplink resource for the to-be-transmitted data of the terminal device through dynamic scheduling.

Optionally, the base station may reallocate an uplink SPS resource for the terminal device. For example, when the arrival period of the data changes, the base station may configure and activate the new uplink SPS resource for the terminal device based on a new arrival period of the data.

It can be understood that, the foregoing resource scheduling manner is only an example. The base station may use various available resource scheduling manners in the prior art, and this is not specifically limited in this embodiment.

After obtaining the uplink resource allocated by the base station, the terminal device may transmit uplink data including the data on the first logical channel by using the uplink resource.

According to the foregoing method, during uplink SPS transmission limited by the SR masking, the terminal device can still trigger the SR after determining that the predefined triggering condition is satisfied, thereby reducing PDCCH scheduling overheads and implementing flexible triggering. This ensures timely obtaining of the scheduling resource and effective data transmission, so as to avoid a data packet loss. Further, SPS can support transmission of data whose status changes, an application range of SPS is extended.

Optionally, the solution of this embodiment may include step 204. In step 204, the base station sends reconfiguration information of the first logical channel to the terminal device based on a preset condition.

In this embodiment, the terminal device cancels a limitation of the SR masking on the first logical channel based on the reconfiguration information.

Optionally, the base station may send the reconfiguration information of the first logical channel to the terminal device after a quantity of times of receiving the regular BSR of the first logical channel is greater than n times, and the terminal device cancels the limitation of the SR masking on the first logical channel based on the reconfiguration information. n is an integer greater than 0, and the base station may determine a value of n based on an actual transmission requirement.

In this embodiment, the base station sends the reconfiguration information of the first logical channel to the terminal device by using an RRC dedicated message RRCConnectionReconfiguration, and sets a logicalChannelSR-Mask field in the RRC dedicated message RRCConnectionReconfiguration to "default". In this way, the limitation of the SR masking on the first logical channel is canceled.

After the limitation of the SR masking is canceled, the first logical channel is used to trigger and report the SR and the regular BSR in an existing scheduling manner in subsequent data transmission when there is to-be-transmitted data, to request resource scheduling to the base station in time.

According to the scheduling request triggering method described in step 201 to step 204 of this embodiment, when a data transmission requirement of the terminal device does not match the allocated SPS resource any longer, the terminal device can quickly adapt to a status change of data and obtain a new uplink resource in a more suitable scheduling manner, to ensure timely data transmission.

Figure 4:
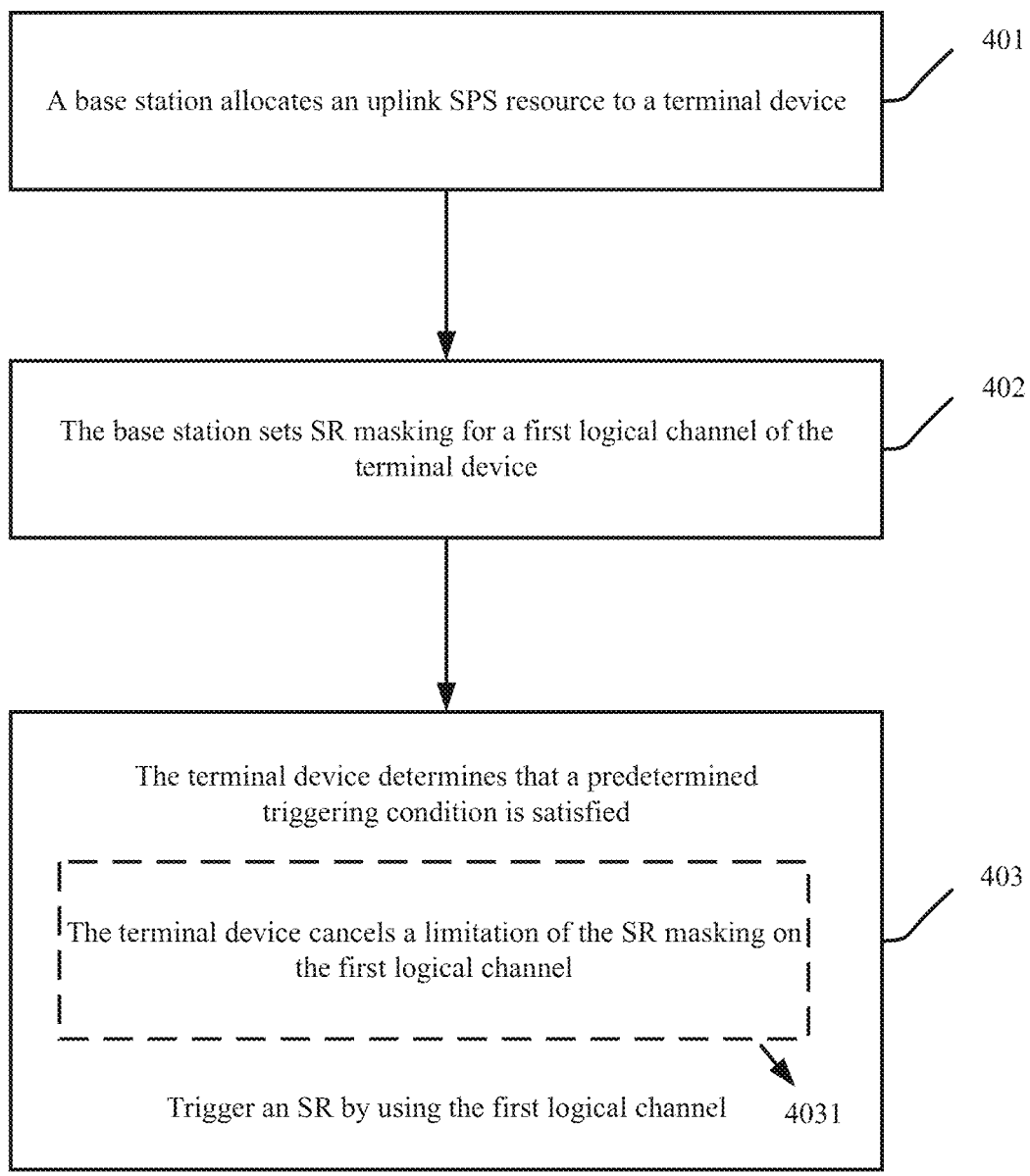
FIG. 4 is a flowchart of a scheduling request triggering method according to another embodiment of the present disclosure.
Figure 5:
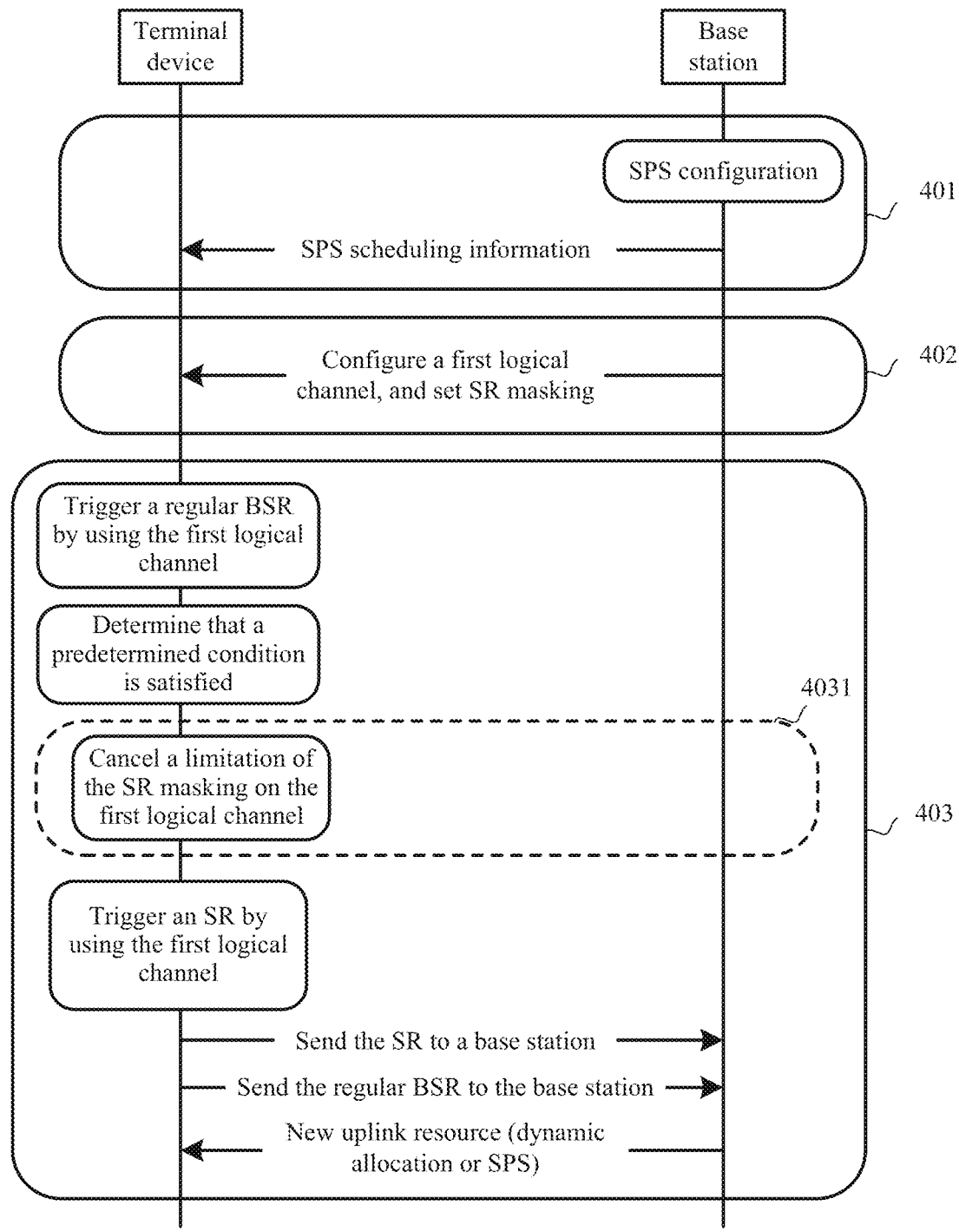
FIG. 5 is a schematic diagram of a scheduling request triggering method according to another embodiment of the present disclosure.

FIG. 4 and FIG. 5 are a flowchart and a schematic diagram of a scheduling request triggering method according to an embodiment of the present disclosure, respectively. With reference to FIG. 4 and FIG. 5, the following describes the method provided in another embodiment. In this embodiment, step 401 and step 402 are the same as step 201 and step 202 of the method shown in FIG. 2 and FIG. 3, and details are not repeated herein again. It should be noted that, in this embodiment, there is also no necessary sequence between step 401 and step 402.

In step 403, after determining that a predefined triggering condition is satisfied, the terminal device triggers an SR via the first logical channel.

As shown in FIG. 5, when a new to-be-transmitted data packet arrives at the first logical channel, a regular BSR is triggered at a MAC protocol layer. The regular BSR is the same as the regular BSR in the method shown in FIG. 2 and FIG. 3. In this embodiment, the terminal device determines, at the MAC protocol layer after triggering the regular BSR on the first logical channel, whether the predefined triggering condition of the SR is satisfied for the first logical channel. It can be understood that, the predefined triggering condition is the same as the predefined triggering condition in step 203 in the embodiment of FIG. 2 and FIG. 3, and details are not specifically described herein again.

When determining that the predefined triggering condition is not satisfied, the terminal device does not trigger the SR via the first logical channel and does not perform a subsequent operation. When determining that the predefined triggering condition is satisfied, the terminal device triggers the SR via the first logical channel and performs a subsequent operation.

Optionally, in step 403 of this embodiment, step 4031 may be further included: After the terminal device determines that the predefined triggering condition is satisfied, the terminal device autonomously cancels a limitation of the SR masking on the first logical channel.

As shown in FIG. 5, in step 4031, when the predefined triggering condition of the SR is satisfied, the terminal device autonomously cancels the limitation of the SR masking on the first logical channel at the MAC protocol layer. Then, each time a data packet arrives at the first logical channel and the terminal device triggers a regular BSR, the terminal device normally triggers and reports an SR by using a method in the prior art, to request an uplink resource.

After step 403, the terminal device sends the SR to the base station. After receiving the SR from the terminal device, the base station allocates, to the terminal device, an uplink resource used for reporting the regular BSR. The terminal device reports the regular BSR to the base station by using the uplink resource, and the base station allocates an uplink resource for to-be-transmitted data of the terminal device based on volume information, included in the regular BSR, of the data buffered on the first logical channel. An allocation manner of the uplink resource is same as that in the method shown in FIG. 2 and FIG. 3, and details are not repeated herein.

In this embodiment, after receiving the regular BSR reported by the terminal device, the base station can know that the terminal device has autonomously canceled the limitation of the SR masking on the first logical channel.

In this embodiment, after satisfying the triggering condition of the SR is satisfied, the terminal device can autonomously cancel the limitation of the SR masking on the first logical channel, adapt to a status change of data, and change to a more appropriate scheduling manner. This ensures that the resource scheduled by the base station is obtained in a timely manner in a subsequent data transmission process, so as to avoid a data packet loss.

The foregoing mainly describes the solutions provided in the embodiments of the present disclosure from the perspective of interaction between network elements. It can be understood that, to implement the foregoing functions, each network element such as a terminal, access network device, a core network device includes corresponding hardware structure and/or software modules for performing each function. A person skill in the art should be easily aware that, the units and algorithm steps in the examples described with reference to the embodiments disclosed in this specification may be implemented by hardware or a combination of hardware and computer software. Whether a function is implemented by hardware or in a manner of driving hardware by a computer software depends on a particular application and a design constraint condition of the technical solution. A person skilled in the art may use a different method to implement the described functions for each particular application, but it should not be considered that the implementation goes beyond the scope of the present disclosure.

Figure 6:
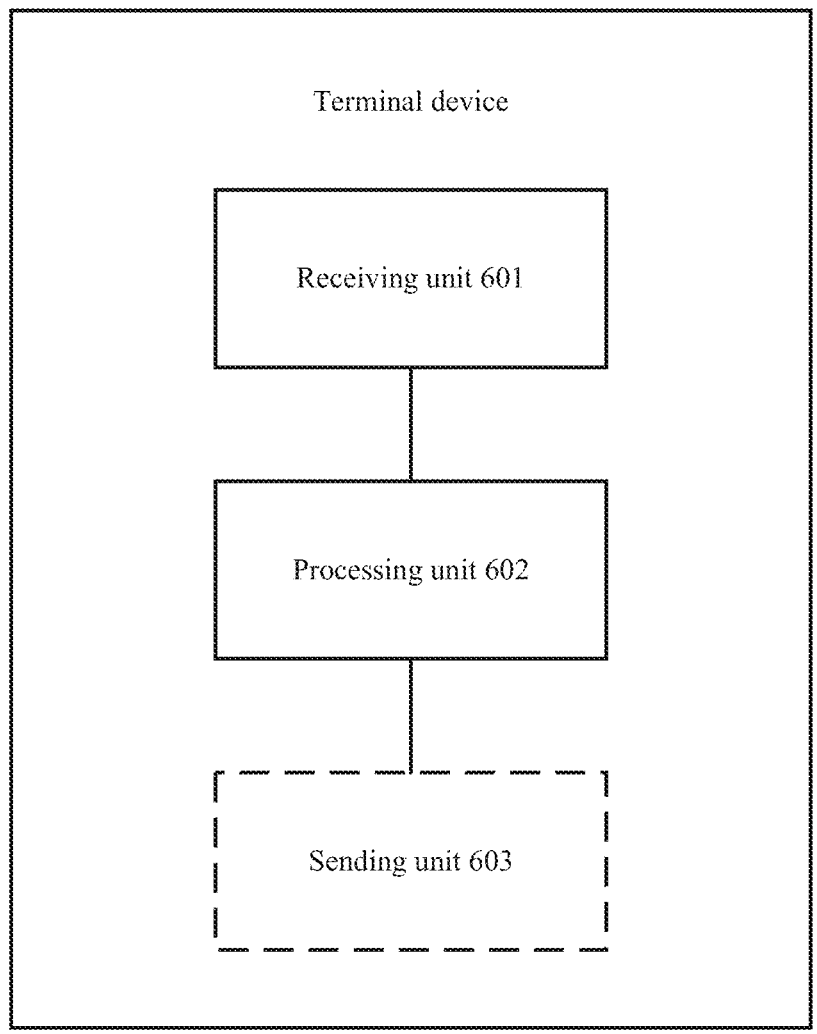
FIG. 6 is a schematic structural diagram of a terminal device according to an embodiment of the present disclosure.

FIG. 6 is a possible schematic structural diagram of the terminal device in the foregoing embodiments. The terminal device may be one of the terminal devices 20A to 20C shown in FIG. 1. The terminal device includes a receiving unit 601 and a processing unit 602.

The receiving unit 601 is configured to receive configuration information of an uplink SPS resource allocated by a base station to the terminal device, where the uplink SPS resource is used to transmit to-be-transmitted data on a logical channel of the terminal device. The receiving unit 601 is further configured to receive SR masking set by the base station for a first logical channel of the terminal device.

Optionally, the receiving unit 601 may be further configured to receive reconfiguration information, sent by the base station based on the preset condition in step 204 in the method described in FIG. 2 and FIG. 3, of the first logical channel.

The processing unit 602 is configured to obtain the uplink SPS resource based on the configuration information of the uplink SPS resource received by the receiving unit 601. The processing unit 602 is further configured to trigger, via the first logical channel, an SR after determining that a predefined triggering condition is satisfied. The predefined triggering condition is the predefined triggering condition in step 203 of the embodiment described in FIG. 2 and FIG. 3 or the predefined triggering condition in step 403 of the embodiment described in FIG. 4 and FIG. 5. The processing unit 602 is further configured to trigger, before triggering the SR via the first logical channel, a regular BSR via the first logical channel. The regular BSR is triggered when the data arrives at the first logical channel.

Optionally, the processing unit 602 may be further configured to autonomously cancel a limitation of the SR masking on the first logical channel when determining that the predefined triggering condition is satisfied.

Optionally, the processing unit 602 may be further configured to cancel a limitation of the SR masking on the first logical channel based on the reconfiguration information, sent by the base station and received by the receiving unit 601, of the first logical channel.

Optionally, the terminal device may further include a sending unit 603. The sending unit 603 may be configured to send the SR and the regular BSR to the base station.

Figure 7:
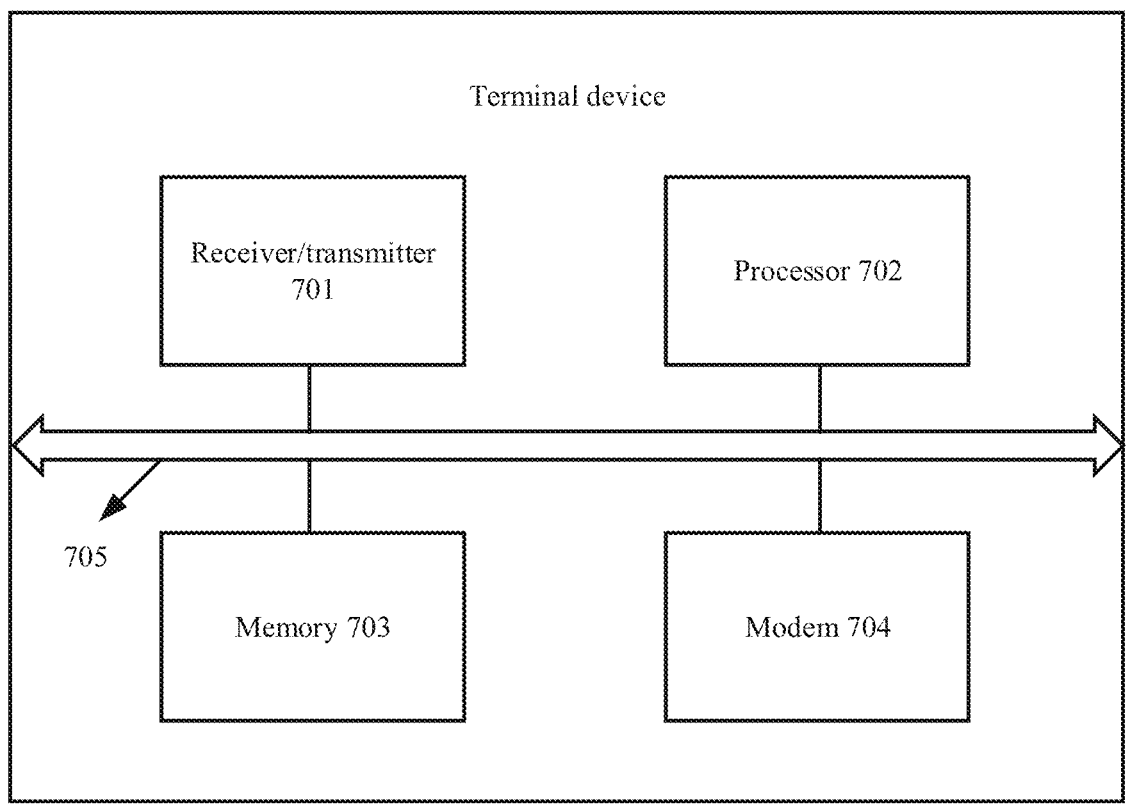
FIG. 7 is a schematic structural diagram of a terminal device according to another embodiment of the present disclosure.

FIG. 7 is a possible schematic structural diagram of the terminal device in the foregoing embodiments. The terminal device includes a receiver/transmitter 701 and a processor 702. The receiving unit 601 and the sending unit 603 described in FIG. 6 may be corresponding to the receiver/transmitter 701, and the receiver/transmitter 701 may be configured to support sending and receiving data between a base station and the terminal device in the foregoing embodiments. The processing unit 602 may be corresponding to the processor 702.

The terminal device may further include a memory 703 that can be configured to store program code and data of the terminal device. The terminal device may further include a modem 704 that is configured to support the terminal device in processing service data and a signaling message.

Components of the terminal device are coupled together by using a bus system 705. In addition to a data bus, the bus system 705 further includes a power bus, a control bus, and a status signal bus. However, for clear description, various types of buses are marked as the bus system 705 in the FIG. 7.

Figure 8:
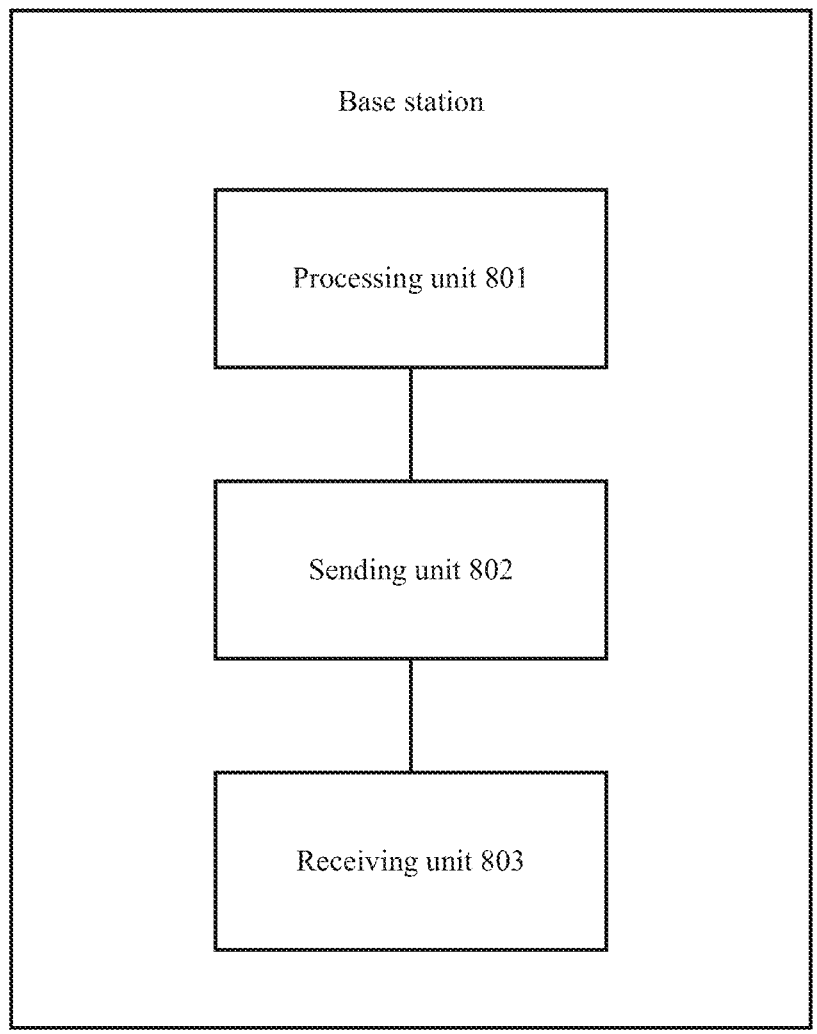
FIG. 8 is a schematic structural diagram of a base station according to an embodiment of the present disclosure.

FIG. 8 is a possible schematic structural diagram of the base station in the foregoing embodiments. The base station may be the base station 10 shown in FIG. 1. The base station includes a processing unit 801, a sending unit 802, and a receiving unit 803.

The processing unit 801 may be configured to configure an uplink SPS resource for a terminal device, where the uplink SPS resource is used to transmit to-be-transmitted data on a logical channel of the terminal device. The processing unit 801 is further configured to set SR masking for a first logical channel of the terminal device.

Optionally, the processing unit 801 may be further configured to determine, based on a preset condition, whether to send reconfiguration information of the first logical channel to the terminal device. The preset condition is the preset condition in step 204 of the embodiment of FIG. 2 and FIG. 3.

Optionally, the processing unit 801 may be further configured to: after receiving an SR sent by the terminal device, configure, for the terminal device, an uplink resource for sending a regular BSR. The processing unit 801 may be further configured to configure a new uplink resource for the to-be-transmitted data of the terminal device based on volume information, included in the regular BSR, of the data buffered on the first logical channel. The new uplink resource may be allocated through dynamic scheduling, or the new uplink resource may be a new uplink SPS resource, and a specific configuration manner is the same as that in the method described in step 203 of the embodiment of FIG. 2 and FIG. 3.

The sending unit 802 is configured to send configuration information of the uplink SPS resource to the terminal device and send the SR masking set for the first logical channel to the terminal device.

Optionally, the sending unit 802 is further configured to send, to the terminal device, configuration information of the new uplink resource configured for the terminal device by the processing unit 801.

Optionally, the sending unit 802 may be further configured to send reconfiguration information of the first logical channel to the terminal device. The terminal device cancels a limitation of the SR masking on the first logical channel based on the reconfiguration information.

The receiving unit 803 is configured to receive the SR and the regular BSR sent by the terminal device, where the SR is triggered by the terminal device via the first logical channel after the terminal device determines that a predefined triggering condition is satisfied. The predefined triggering condition is the predefined triggering condition in step 203 of the embodiment described in FIG. 2 and FIG. 3 or the predefined triggering condition in step 403 of the embodiment described in FIG. 4 and FIG. 5.

Optionally, the receiving unit 803 may be further configured to receive information that the terminal device autonomously cancels the limitation of the SR masking on the first logical channel after the terminal device determines that the predefined triggering condition is satisfied.

Optionally, the receiving unit 803 may be further configured to receive the regular BSR that is triggered by the first logical channel and that is sent by the terminal device.

Figure 9:
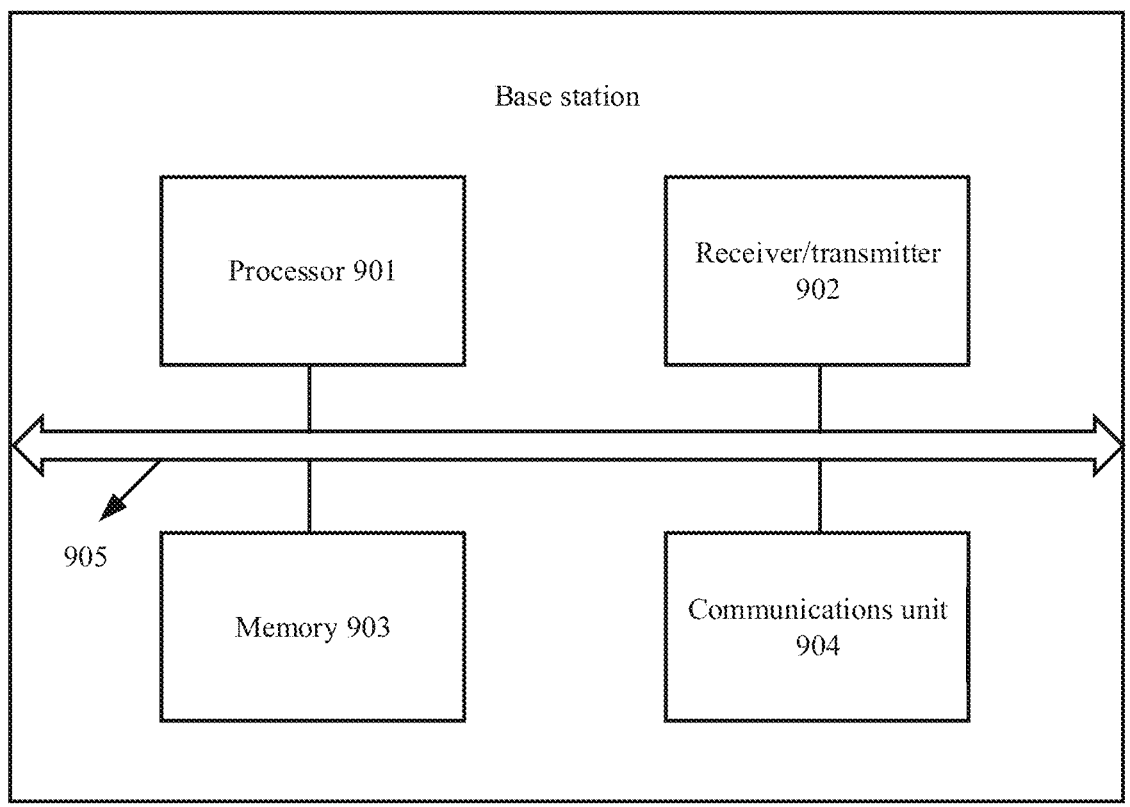
FIG. 9 is a schematic structural diagram of a base station according to another embodiment of the present disclosure.

FIG. 9 is a possible schematic structural diagram of the base station in the foregoing embodiments. The base station includes a processor 901 and a receiver/transmitter 902. The processing unit 801 described in FIG. 8 may be corresponding to the processor 901, the sending unit 802 and the receiving unit 803 described in FIG. 8 may be corresponding to the receiver/transmitter 902, and the receiver/transmitter 902 may be configured to support sending and receiving data between the base station and the terminal device in the foregoing embodiments. The base station may further include a memory 903 that can be configured to store program code and data of the base station. The base station may further include a communications unit 904 that is configured to support communication between the base station and another network entity.

Components of the base station are coupled together by using a bus system 905. In addition to a data bus, the bus system 905 further includes a power bus, a control bus, and a status signal bus. However, for clear description, various types of buses are marked as the bus system 905 in FIG. 9.

It can be understood that, FIG. 9 only shows a simplified design of the base station. In actual application, an access network device may include any quantity of transmitters, receivers, processors, controllers, memories, communications units, and the like, and all access network devices that can implement the present disclosure fall within the protection scope of the present disclosure.

It can be understood that, the processor in this embodiment of the present disclosure may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various example logical blocks, modules, and circuits that are described with reference to the content disclosed in the present disclosure. The processor may also be a combination of computing functions, for example, a combination of one or more microprocessors or a combination of a DSP and a microprocessor.

Steps of the methods or algorithms described in the embodiments of the present disclosure may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Optionally, the storage medium may be further integrated into a processing unit. The processing unit and the storage medium may be arranged in an ASIC, and the ASIC may be arranged in a user terminal device. Optionally, the processing unit and the storage medium may be arranged in different components of the user terminal device.

A person of skill in the art should be aware that in one or more of the foregoing examples, the functions described in the embodiments of the present disclosure may be implemented by using hardware, software, firmware, or any combination thereof. If implemented in software, these functions can be stored on a computer readable medium or transmitted as one or more instructions or codes to a computer readable medium. The computer readable medium includes a computer storage media and a communications media that facilitate the transfer of computer programs from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that can be used to carry or store program code, where the program code is in a form of an instruction or a data structure or in a form that can be read by a general/special computer or a general/special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method, implemented by a terminal device, the method comprising:
   obtaining an uplink semi-persistent scheduling resource allocated by a base station, wherein the uplink semi-persistent scheduling resource is used to transmit to-be-transmitted data on a logical channel of the terminal device;
   receiving scheduling request masking set by the base station for a first logical channel;
   after determining that a triggering condition is satisfied, triggering a scheduling request via the first logical channel;
   receiving reconfiguration information, from the base station based on a preset condition, of the first logical channel, wherein the preset condition is that a quantity of times of receiving a regular buffer status report of the first logical channel by the base station is greater than n, wherein n is an integer that is greater than 0 and that is determined based on a data transmission requirement; and
   canceling a limitation of the scheduling request masking on the first logical channel based on the reconfiguration information.

2. The method according to claim 1, wherein before triggering a scheduling request via the first logical channel, the method further comprises:
   triggering a regular buffer status report via the first logical channel, wherein the regular buffer status report is triggered when the data arrives at the first logical channel.

3. The method according to claim 1, wherein the triggering condition comprises at least one of the following conditions:
   a. from a time when a regular buffer status report is triggered, in subsequent K transmission time intervals, there is no uplink resource allocated by the base station to the terminal device, wherein K is an integer greater than 0;
   b. a volume of the to-be-transmitted data buffered on the first logical channel is greater than a specified threshold;
   c. an upper layer protocol stack of the terminal device instructs to discard a part of the to-be-transmitted data on the first logical channel;
   d. a volume of the data buffered on the first logical channel is reduced, and the terminal device has no to-be-transmitted MAC PDU in a current transmission time interval; and
   e. an arrival period of a data packet on the first logical channel changes.

4. The method according to claim 1, wherein after determining that the triggering condition is satisfied, the method further comprises:
   canceling autonomously a limitation of the scheduling request masking on the first logical channel.

5. The method according to claim 1, further comprising: sending the scheduling request to the base station.

6. A terminal device, comprising:
   a receiver, configured to receive configuration information of an uplink semi-persistent scheduling resource allocated by a base station; and
   a processor, configured to obtain the uplink semi-persistent scheduling resource based on the configuration information, wherein the uplink semi-persistent scheduling resource is used to transmit to-be-transmitted data on a logical channel of the terminal device, wherein
   the receiver is further configured to receive scheduling request masking set by the base station for a first logical channel;
   the processor is further configured to trigger, via the first logical channel, a scheduling request after determining that a triggering condition is satisfied;
   the receiver is further configuration to receive reconfiguration information, from the base station based on a preset condition, of the first logical channel, wherein the preset condition is that a quantity of times of receiving a regular buffer status report of the first logical channel by the base station is greater than n, wherein n is an integer that is greater than 0 and that is determined based on a data transmission requirement; and
   the processor is further configured to cancel a limitation of the scheduling request masking on the first logical channel based on the reconfiguration information.

7. The terminal device according to claim 6, wherein before the processor triggers the scheduling request via the first logical channel, the processor is further configured to:
   trigger a regular buffer status report via the first logical channel, wherein the regular buffer status report is triggered when the data arrives at the first logical channel.

8. The terminal device according to claim 7, wherein the triggering condition comprises at least one of the following conditions:
   a. from a time when a regular buffer status report is triggered, in subsequent K transmission time intervals, there is no uplink resource allocated by the base station to the terminal device, wherein K is an integer greater than 0;
   b. a volume of the to-be-transmitted data buffered on the first logical channel is greater than a specified threshold;

c. an upper layer protocol stack of the terminal device instructs to discard a part of the to-be-transmitted data on the first logical channel;
d. a volume of the data buffered on the first logical channel is reduced, and the terminal device has no to-be-transmitted MAC PDU in a current transmission time interval; and
e. an arrival period of a data packet on the first logical channel changes.

9. The terminal device according to claim 6, wherein the processor is further configured to autonomously cancel a limitation of the scheduling request masking on the first logical channel after determining that the triggering condition is satisfied.

10. The terminal device according to claim 6, further comprising:
a transmitter, configured to send the scheduling request to the base station.

11. A base station, comprising:
a processor, configured to configure an uplink semi-persistent scheduling resource for a terminal device, and set scheduling request masking for a first logical channel of the terminal device, wherein the uplink semi-persistent scheduling resource is configured to enable the terminal device to transmit to-be-transmitted data on a logical channel of the terminal device;
a transmitter, configured to send configuration information of the uplink semi-persistent scheduling resource to the terminal device, and send the scheduling request masking to the terminal device;
a receiver, configured to receive a scheduling request from the terminal device, wherein the scheduling request is triggered by the terminal device via the first logical channel after the terminal device determines that a triggering condition is satisfied; and
the transmitter is further configured to send reconfiguration information of the first logical channel to the terminal device based on a preset condition, the preset condition is that a quantity of times of receiving a regular buffer status report of the first logical channel by the receiver is greater than n, wherein n is an integer that is greater than 0 and that is determined based on a data transmission requirement.

12. The base station according to claim 11, wherein the receiver is further configured to receive a regular buffer status report that is triggered via the first logical channel from the terminal device, wherein the regular buffer status report includes volume information of the data buffered on the first logical channel.

13. The base station according to claim 11, wherein the triggering condition comprises at least one of the following conditions:
a. from a time when a regular buffer status report is triggered, in subsequent K transmission time intervals, there is no uplink resource allocated by the base station to the terminal device, wherein K is an integer greater than 0;
b. a volume of the to-be-transmitted data buffered on the first logical channel is greater than a specified threshold;
c. an upper layer protocol stack of the terminal device instructs to discard a part of the to-be-transmitted data on the first logical channel;
d. a volume of the data buffered on the first logical channel is reduced, and the terminal device has no to-be-transmitted MAC PDU in a current transmission time interval; and
e. an arrival period of a data packet on the first logical channel changes.

14. The base station according to claim 11, wherein:
the receiver is further configured to receive a regular buffer status report that is triggered via the first logical channel from the terminal device;
the processor is further configured to configure a new uplink resource for the terminal device based on the regular buffer status report; and
the transmitter is further configured to send configuration information of the new uplink resource to the terminal device.

* * * * *